United States Patent [19]
Michel et al.

[11] Patent Number: 5,356,660
[45] Date of Patent: Oct. 18, 1994

[54] METHOD FOR OBTAINING COMPOSITE CONDUCTIVE MATERIALS BASED ON CONDUCTIVE POLYMERS, WITH CONTROLLED DIELECTRICAL PROPERTIES

[75] Inventors: Philippe Michel, Asnieres; Marie Vergnolle, Palaiseau; Olivier Sagnes, Corbreuse, all of France

[73] Assignee: Thomson-CSF, Puteaux, France

[21] Appl. No.: 950,585

[22] Filed: Sep. 25, 1992

[30] Foreign Application Priority Data

Sep. 27, 1991 [FR] France .................. 91 11911

[51] Int. Cl.[5] .......................... B05D 1/00
[52] U.S. Cl. ............................ 427/121; 427/58
[58] Field of Search ................. 427/121, 58

[56] References Cited

U.S. PATENT DOCUMENTS

| | | | |
|---|---|---|---|
| 4,617,228 | 10/1986 | Newman | 427/121 |
| 4,699,804 | 10/1987 | Miyata | 427/108 |
| 4,888,243 | 12/1989 | Jonas | 427/121 |
| 5,104,580 | 4/1992 | Henry | 252/500 |

FOREIGN PATENT DOCUMENTS

| | | |
|---|---|---|
| 296263 | 12/1988 | European Pat. Off. . |
| 301930 | 2/1989 | European Pat. Off. . |
| 91/00314 | 1/1991 | World Int. Prop. O. . |

OTHER PUBLICATIONS

C. Cooper et al., Journal of Physics D: Applied Physics, vol. 22, No. 11, Nov. 14, 1989, pp. 1580–1585. "Electrically conducting organic films and beads based on conducting latex particles".

*Primary Examiner*—Shrive Beck
*Assistant Examiner*—Vi Duong Dang
*Attorney, Agent, or Firm*—Oblon, Spivak, McClelland, Maier & Neustadt

[57] ABSTRACT

Disclosed is a method to obtain a film of composite material based on particles of conductive polymer, stabilized by a highly steric or highly ionic surfactant. The efficient stabilization of the particles makes it possible to control the progress of the dielectrical properties of the materials as a function of the conductive entity content, leading to the preparation of films with variable impedance. The method can be applied to the making of coatings that meet goals related to electromagnetic wide-band attenuation. FIG. 2 .

7 Claims, 2 Drawing Sheets

METHOD FOR OBTAINING COMPOSITE CONDUCTIVE MATERIALS BASED ON CONDUCTIVE POLYMERS, WITH CONTROLLED DIELECTRICAL PROPERTIES

BACKGROUND OF THE INVENTION

1. Field of the Invention

The field of the invention is that of composite materials based on conductive polymers, which can be used for coatings that meet goals of achieving electromagnetic wide-band attenuation.

To attain goals such as these, it is necessary to control the dielectrical properties of the materials used so as to superimpose layers of materials, the properties of which give the resulting structure an impedance gradient.

2. Description of the Prior Art

At present, materials based on conductive polymer show promising characteristics for the absorption of electromagnetic waves. However, the control of the conductive properties with the conductive polymer content in the material is still very uncertain owing to the phenomenon of percolation.

More specifically, this phenomenon of physics, which corresponds to the sudden passing from the properties of an insulator substance A to those of a conductive substance B when the populations A and B are mixed, depends on various parameters such as the size and shape of the conductive particle and the nature of the insulating binder matrix (its compatibility and its wetting capacity). Thus it has been shown by B. Wessling, at the ANTEC Congress 91, Montreal, Canada, that the phenomenon of percolation occurs at between 1% and 5% by weight in the case of polyaniline dispersed in a polyvinyl chloride (PVC) matrix or nylon matrix making the conductivity go suddenly from about $10^{-4}$ S/cm to 1 S/cm. Other work by B. Tieke (CIBA GEIGY, Polymer 1990, 31, 20) shows that polypyrrole electropolymerized in a polyimide has a percolation jump that is even lower between 0.2% and 0.5% by weight. With composite materials such as these, it is therefore not possible to control the conductivity as a function of the conductive charge content since there is a sudden change from an insulator state to a conductive state, the mechanical properties of which are those of the conductive polymer giving rise to brittle materials that are hard to use and .do not benefit from the filmogenic properties of the binder matrix.

SUMMARY OF THE INVENTION

This is why the present invention proposes a method for obtaining composite materials based on conductive polymer, making it possible to sharply attenuate the phenomenon of percolation and providing for a gradual change from the insulating properties to the conductive properties as a function of the conductive charge content. The range of values of concentration at which this change takes place is such that it is possible to have materials available that can be exploited because they are filmogenic and can hence be easily deposited, with dielectric properties that are well calibrated in order to make layers of materials of varying absorbency. To this end, the method according to the invention uses the chemistry of polymers in colloidal media to synthesize particles of conductive polymer latex and particles of insulating filmogenic polymer latex. The mixing of these two latexes has the advantage of being done in a dispersed medium through the use of two compatible organic populations of spherical particles capable of coming together favorably. More specifically, the method according to the invention comprises the codepositing of a conductive polymer latex and an insulating filmogenic polymer latex, wherein the particles of conductive polymer latex are stabilized by a highly steric surfactant of the cellulose derivative type or by a highly ionic surfactant of the polymer type comprising sulfonate groups. Preferably, the conductive polymer used is polypyrrole and the insulating filmogenic polymer may be a styrene-acrylate copolymer. A good stabilizer of the polypyrrole latex particles may be methylcellulose which generates a high degree of steric hindrance around the particles. The concentration, by weight, of surfactant in relation to the pyrrole monomer may be chosen to be close to 25%. The stabilization may also be ionic and may be achieved by polyvinylsulfonate. In this case, it is necessary to increase the percentage by weight of surfactant/pyrrole which may be in the neighborhood of 300%. The advantage of polyvinylsulfonate lies in its ease of use. It is available in the form of solution, and this averts any problem of dissolving. The insulating latex is preferably made from a filmogenic polymer that can be a styrene-acrylate copolymer.

BRIEF DESCRIPTION OF THE DRAWINGS

The present invention shall be understood more clearly and other advantages shall appear from the following description, given as a non-restrictive example, and from the appended drawings of which.

MORE DETAILED DESCRIPTION

Figure 1:
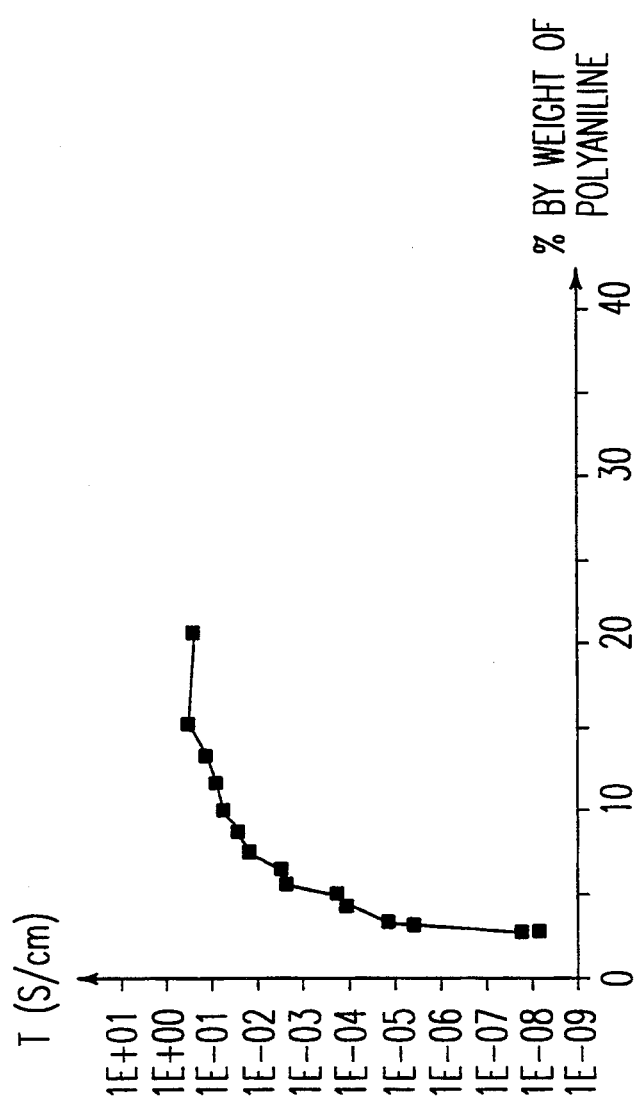
FIG. 1 shows the development or progress of the conductivity of a composite material based on conductive polymer as a function of the percentage, by weight, of conductive polymer, according to the prior art.

The present invention proposes to greatly minimize the percolation effect obtained conventionally with conductive particles dispersed in a binding insulator compound. FIG. 1 clearly illustrates the phenomenon of percolation obtained with polyaniline as a conductive polymer dispersed in an insulating polymer, illustrating this phenomenon through the progress of the conductivity as a function of the percentage, by weight, of conductive polymer according to the prior art. Now, the gradual variation of the conductivity with the concentration in conductive charge can be obtained only with the control of the dispersal of the charge and the control of the effects of aggregates and of the contact between particles. Thus, when a homogeneous dispersal is obtained, without any mutual contact of the particles, it is possible to prevent a sudden jump in conductivity for low concentrations, which would signify the presence of conductive aggregates. Indeed, when the conductive particles are sufficiently well dispersed in a binding matrix, the conductivity measured at zero frequency should be practically zero, and only a conductivity in frequency may be detected provided that the space between is commensurable with the incident wavelength of measurement. The jump in conductivity seen in FIG. 1 proves the presence of aggregrates between conductive particles.

This is why the method of the invention proposes to surround the conductive particles with a ring enabling them to be insulated from one another. More specifically, these are particles of conductive polymer surrounded with a ring of surfactant enabling the stabilizing of the particles and the prevention or the limiting of the phenomena related to aggregates. The method used to obtain the film of conductive material thus preferably includes the following steps:

1) Synthesis of the Conductive Polymer in Latex Form:

To obtain the conductive latex, the conventional chemistry of standard copolymers is used. These conductive copolymers are stabilized in suspension by surfactants chosen so as to ensure good stabilization that is highly steric or ionic. The synthesis of the conductive polymer is initiated by a reaction between the monomer and an oxidizing agent in an aqueous medium. When the polymerization has been done, the suspension of conductive particles is centrifuged at a speed of over 1000 rpm for several minutes. The part floating on the surface is eliminated, hence the excess ions are eliminated, in order to obtain a suspension compatible with the insulating latex. The product is redispersed in distilled water. Typically, the particles of conductive polymer latex have a size of some hundreds of nanometers and are highly monodispersed.

2) Synthesis of Filmogenic Insulating Polymer:

An emulsion technique of polymerization with free radicals is used. After polymerization, the bath comprising ionic impurities is washed with an ion-exchanging resin that is formed by grains capable of capturing the impurities. Thus, after filtration, there are recovered, firstly, a solid part with impurities and, secondly, the insulating polymer latex itself. The particles are also well monodispersed and have a size of some hundreds of nanometers.

3) Mixture of the Two Latexes

The solution of conductive polymer latex is added to the solution of filmogenic insulating polymer latex, each solution being weakly concentrated (with a molar concentration of about 5% to 10%).

4) Drying of the Mixture

The solution is oven-dried at low temperature (about 40° C.) in order to limit the phenomena of convection and the disorder in the material. The efficiency of the surfactant makes it possible to minimize the effects of sedimentation of the particles of conductive polymer which have a high density of the order of 1.2 to 1.3 while the particles of insulating latex have a density rather in the region of 1.

Thus a film of composite material is obtained, with electromagnetic properties that can be controlled as a function of the composition of the film.

Examples of the Making of Composite Films Out of a Mixture of Polypyrrole Latex and Butyl Styrene-Acrylate Latex

EXAMPLE 1

The surfactant used is methylcellulose. For the synthesis of the polypyrrole latex, 5 g of methylcellulose, 10 g of pyrrole and 81 g of $FeCl_3$, $6H_2O$ (oxidizing agent) are added to 700 ml of water. This is all shaken constantly at a speed of 500 rpm for 14 hours. The latex obtained is stable and has a dry extract content of about 3% to 5% after washing by centrifuging.

The filmogenic insulating latex is obtained by the emulsion technique of copolymerization of styrene and butyl acrylate using free radicals.

Figure 2:
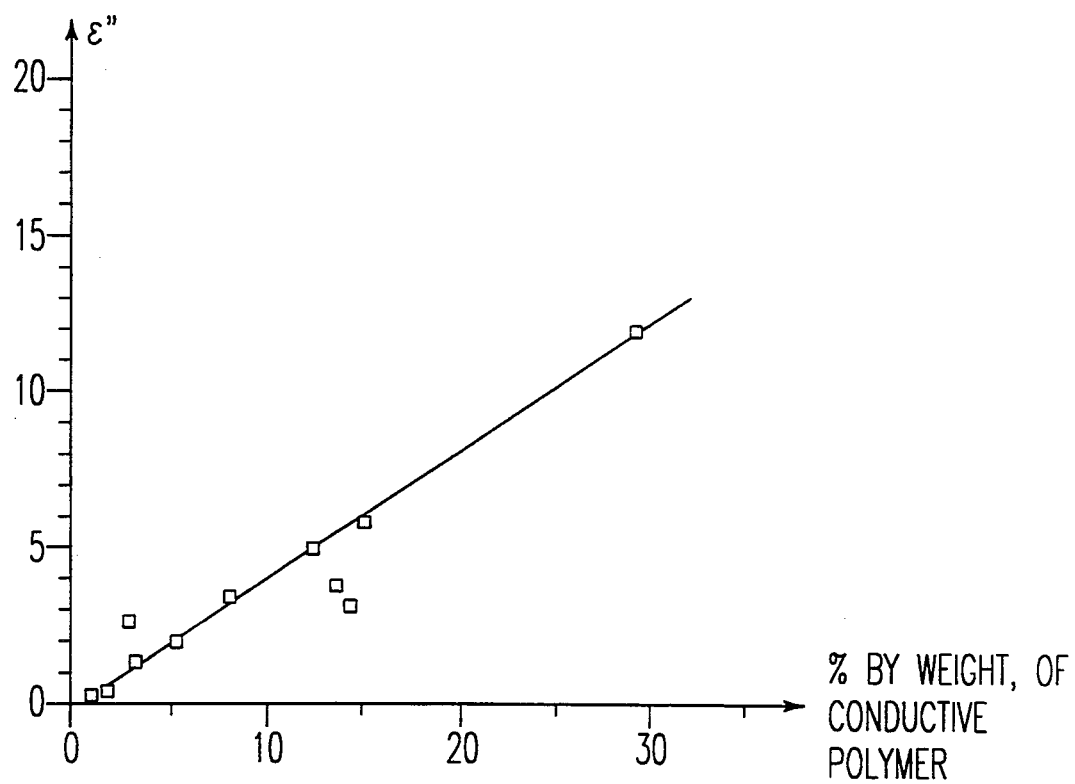
FIG. 2 shows the progress of the dielectrical permittivity for a composite film according to the invention, obtained from polypyrrole latex stabilized by methylcellulose and butyl styrene-acrylate copolymer latex, as a function of the conductive polymer content of the film.

The drying is done for about 60 hours at 45° C. The films obtained using variable values of conductive population content were tested by thermal gravimetric analysis and elementary analysis in order to verify the values of conductive poller content, and the dielectrical analysis of these films is shown in FIG. 2. This analysis was done at 9.5 GHz, the permittivity $\epsilon''$ being related to the conductivity G by the following relationship: $\sigma = \omega\epsilon_0\epsilon''$ where $\omega$ is the frequency of measurement. The curve of FIG. 2 representing the progress of the permittivity as a function of the conductive poller content in the composite film shows the linear behavior of the dielectrical properties as a function of the percentage of conductive entity. The phenomenon of percolation is thus mastered by means of the insulating ring of surfactants which surrounds the particles of conductive polymer.

EXAMPLE 2

The surfactant used is polyvinylsulfonate. The synthesis of the polypyrrole latex is done under the following experimental conditions:

10 g of pyrrole, 71 g of $FeCl_3$, $6H_2O$ and 251 g of a solution with a concentration of 25%, by weight, of sodium polyvinylsulfonate (i.e. about 60 g of sodium polyvinylsulfonate salt) are added to 900 ml of water. This is all shaken constantly at a speed of 500 rpm for 15 hours and 30 minutes. After washing, the conductive polymer latex is added to a butyl styrene-acrylate copolymer latex. The drying of the mixture is done for 60 hours at 45° C.

Figure 3:
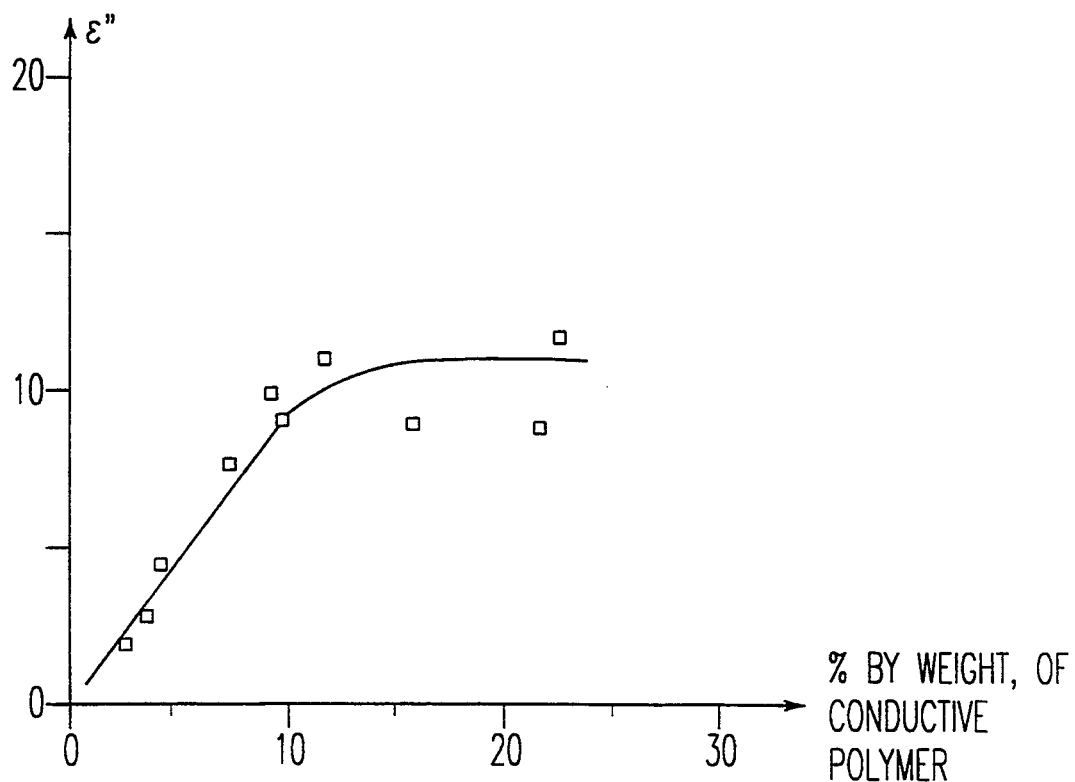
FIG. 3 shows the progress of the permittivity as a function of the percentage of conductive polymer in a composite film obtained from polypyrrole latex stabilized by polyvinylsulfonate and butyl styrene-acrylate latex.

FIG. 3 illustrates the behavior of the dielectrical permittivity of the film obtained as a function of the conductive polypher content of the composite film. A linear evolution is also obtained showing that the phenomenon of percolation has been greatly minimized through the choice of a highly ionic surfactant enabling the conductive particles to be well insulated from one another.

What is claimed is:

1. A method of obtaining a film of a composite conductive material comprising codepositing a conductive polymer latex and an insulating filmogenic polymer latex, wherein particles of said conductive polymer latex are stabilized by a highly steric cellulose derivative surfactant or by a highly ionic polymer surfactant comprising sulfonate groups so as to minimize the percolation effect.

2. A method according to claim 1, wherein the conductive polymer is polypyrrole.

3. A method according to claim 2, wherein the surfactant is methylcellulose.

4. A method according to claim 3, wherein the ratio by weight of the methylcellulose to the pyrrole monomer is about 25%.

5. A method according to claim 2, wherein the surfactant is polyvinylsulfonate.

6. A method according to claim 5, wherein the ratio by weight of the polyvinylsulfonate to the pyrrole monomer is about 300%.

7. A method according to one of the claims 1 to 6, wherein the insulating filmogenic polymer is a styrene-acrylate copolymer.

* * * * *